US012687247B2

(12) United States Patent
Hwang et al.

(10) Patent No.: US 12,687,247 B2
(45) Date of Patent: Jul. 21, 2026

(54) PIPE CONNECTION DEVICE

(71) Applicant: HS R & A Co., Ltd., Yangsan-si (KR)

(72) Inventors: Kwonsik Hwang, Yangsan-si (KR);
Youngjun Kim, Yangsan-si (KR);
Jaewon Sim, Yangsan-si (KR)

(73) Assignee: HS R & A Co., Ltd., Yangsan-si (KR)

( * ) Notice: Subject to any disclaimer, the term of this
patent is extended or adjusted under 35
U.S.C. 154(b) by 0 days.

(21) Appl. No.: 19/193,971

(22) Filed: Apr. 30, 2025

(65) Prior Publication Data
US 2026/0002615 A1     Jan. 1, 2026

(30) Foreign Application Priority Data
Jun. 28, 2024    (KR) ........................ 10-2024-0085313

(51) Int. Cl.
*F16L 23/032*        (2006.01)
*F16L 23/024*        (2006.01)

(52) U.S. Cl.
CPC ........... *F16L 23/032* (2013.01); *F16L 23/024*
(2013.01)

(58) Field of Classification Search
CPC ....... F16L 23/02; F16L 23/032; F16L 23/024;
F16L 23/028; F16L 23/0283; F16L
23/0286; F16L 39/00; F16L 41/08
See application file for complete search history.

(56) References Cited

U.S. PATENT DOCUMENTS

| | | | |
|---|---|---|---|
| 5,620,016 A | 4/1997 | Katchka | |
| 8,141,911 B2 | 3/2012 | Cho et al. | |
| 11,185,675 B2 | 11/2021 | Feith et al. | |
| 2010/0237615 A1* | 9/2010 | Cho .................... | F16L 23/0283 |
| | | | 285/412 |

FOREIGN PATENT DOCUMENTS

| | | |
|---|---|---|
| JP | H08-261378 A | 10/1996 |
| JP | H11-190461 A | 7/1999 |
| JP | 2001-208269 A | 8/2001 |
| JP | 2022-527369 A | 6/2022 |
| KR | 10-1134318 B1 | 4/2012 |
| WO | WO 1994/025788 A1 | 11/1994 |

OTHER PUBLICATIONS

Extended European Search Report of the corresponding EP Application No. 25171091.9 mailed on Aug. 5, 2025.
Office Action of the corresponding KR Application No. 10-2024-0085313 mailed on Jan. 2, 2026.

* cited by examiner

*Primary Examiner* — Aaron M Dunwoody
(74) *Attorney, Agent, or Firm* — WTA IP Law P.C.

(57) ABSTRACT

A pipe connection device may include a pipe and a flange.
The pipe may include a first region and a second region
extended perpendicularly to the first region. The flange may
include a coupling hole into which at least a portion of the
second region of the pipe is joined. The coupling hole may
include a first part and a second part. The first part may
include a serration and be extended in parallel with a
thickness direction of the flange. The second part may
include an inclined surface formed to be inclined based on
the thickness direction of the flange, and be extended from
the first part to one side surface of the flange.

8 Claims, 4 Drawing Sheets

PIPE CONNECTION DEVICE

CROSS-REFERENCE TO RELATED APPLICATIONS

This application is based on and claims priority under 35 U.S.C. 119(a) to Korean Patent Application No. 10-2024-0085313, filed on Jun. 28, 2024, in the Korean Intellectual Property Office, which is incorporated by reference herein in its entirety.

BACKGROUND

Field

The disclosure relates to a pipe connection device.

Description of Related Art

A pipe connection device may include a pipe and a pipe joint (e.g., a flange) that is joined to at least a portion of the pipe. The pipe may provide a passage through which a refrigerant (e.g., a refrigerant for an air conditioner in a vehicle) circulates. The pipe connection device may be a device for connecting the pipe to an object (e.g., a compressor, a condenser) that requires connection to the pipe.

The pipe can be joined to the side surface of the pipe joint by welding. In the case where the pipe and the pipe joint are joined by welding, the pipe joint must have a welding area with a certain size or more, so the size of the pipe connection device may increase. Also, in this case, a quality problem of the pipe connection device may occur due to a welding dispersion.

The above information may be presented as background information only to assist with an understanding of the disclosure. No determination has been made, and no assertion is made, as to whether any of the above might be applicable as prior art with regard to the disclosure.

SUMMARY

A pipe connection device according to an embodiment of the disclosure may include a pipe and a flange.

In an embodiment, the pipe may include a first region and a second region extended perpendicularly to the first region.

In an embodiment, the flange may include a coupling hole into which at least a portion of the second region of the pipe is joined.

In an embodiment, the coupling hole may include a first part and a second part.

In an embodiment, the first part may include a serration and be extended in parallel with a thickness direction of the flange.

In an embodiment, the second part may include an inclined surface formed to be inclined based on the thickness direction of the flange, and be extended from the first part to one side surface of the flange.

The pipe connection device according to an embodiment of the disclosure connects the pipe and the pipe joint (e.g., the flange) by joining a portion of the pipe into the coupling hole of the pipe joint, so that there may be no need to secure a separate welding area for the pipe joint.

The pipe connection device according to an embodiment of the disclosure does not need to secure a separate welding area for the pipe joint, so that the overall size can be reduced.

The pipe connection device according to an embodiment of the disclosure does not need to secure a separate welding area for the pipe joint, so that quality problems due to welding may not occur.

The pipe connection device according to an embodiment of the disclosure can reduce the space occupied by the device because a portion of the pipe is formed to be extended in a direction perpendicular to the other portion of the pipe.

The pipe joint (e.g., the flange) according to an embodiment of the disclosure can improve the joining force between the pipe and the pipe joint by including the serration.

The pipe joint (e.g., the flange) according to an embodiment of the disclosure can reduce the time and cost for forming the serration because the serration is included only in a part of the joining hole.

The coupling hole of the pipe joint (e.g., the flange) according to an embodiment of the disclosure may include a straight section (e.g., the first part) including the serration and an inclined section (e.g., the second part) not including the serration, thereby allowing the pipe to be fixed at a predetermined position in the pipe joint while improving the joining force between the pipe and the pipe joint.

BRIEF DESCRIPTION OF THE DRAWINGS

In connection with the description of the drawings, the same or similar reference numerals may be used to indicate the same or similar components.

DETAILED DESCRIPTION

Figure 1:
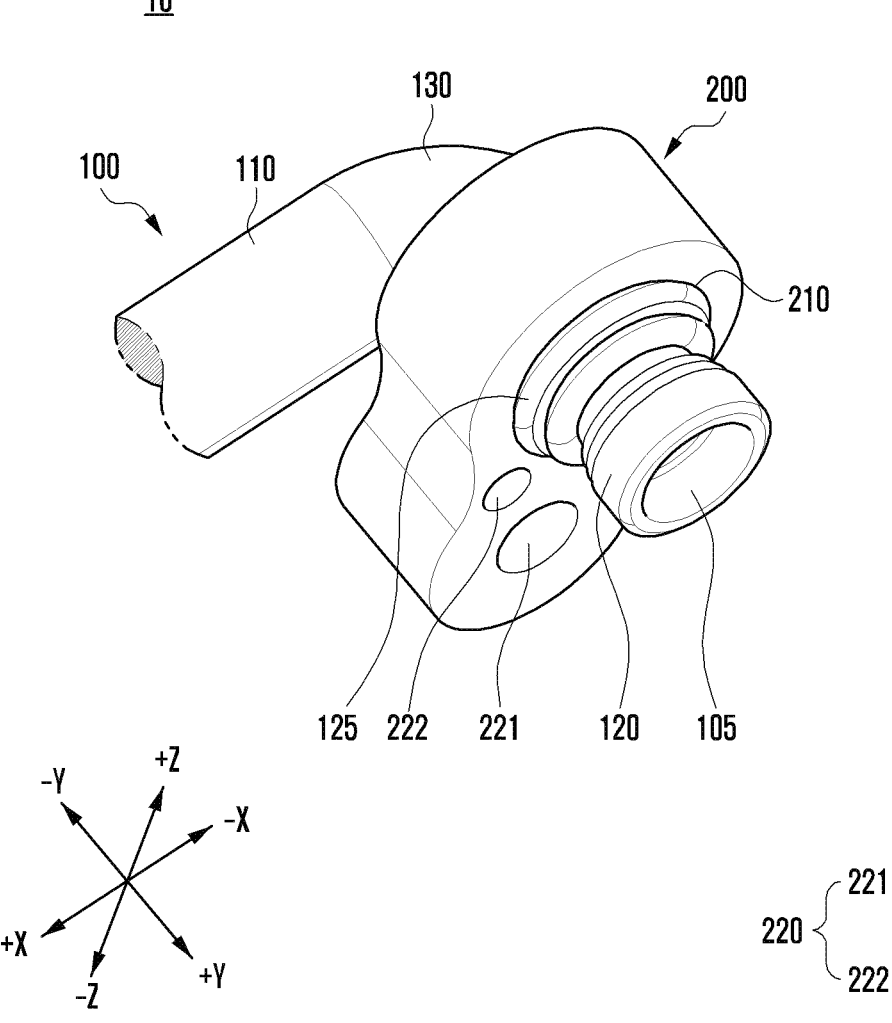
FIG. 1 is a perspective view showing a pipe connection device according to an embodiment of the disclosure.

Now, embodiments of the disclosure will be described with reference to the accompanying drawings. It should be understood that the embodiments of the disclosure and the terminology used therein are not intended to limit the technical features of the disclosure to specific embodiments, but rather to encompass various modifications, equivalents, or alternatives of the embodiments.

In the drawings, similar reference numerals may be used for similar or related components. The singular form of a noun corresponding to an item may mean one or more of the items, unless the relevant context clearly indicates otherwise.

In this document, the phrases "A or B", "at least one of A and B", "at least one of A or B", "A, B, or C", "at least one of A, B, and C", and "at least one of A, B, or C" can each include any one of the items listed together in that phrase, or all possible combinations thereof. The term such as "first" or "second" can be used merely to distinguish the corresponding component from the others and does not limit the corresponding component in any other respect (e.g., importance or order).

FIG. 1 is a perspective view showing a pipe connection device 10 according to an embodiment of the disclosure.

The pipe connection device 10 according to an embodiment of the disclosure may include a pipe 100 and/or a flange 200.

In an embodiment, the pipe connection device 10 may be a device for fixing the pipe 100 to a given position.

In an embodiment, the pipe 100 may be a pipe for circulation of a refrigerant. For example, the pipe 100 may be a pipe for circulation of a refrigerant used in a refrigeration cycle (e.g., a refrigeration cycle for a vehicle).

In an embodiment, the pipe connection device 10 may be a device for connecting the pipe 100 and each component (e.g., a compressor, a condenser, an evaporator) of a refrigeration cycle (e.g., a refrigeration cycle for a vehicle).

In an embodiment, the pipe 100 may be connected to each component (e.g., a compressor, a condenser, an evaporator) of a refrigeration cycle (e.g., a refrigeration cycle for a vehicle).

In an embodiment, the pipe 100 may include a first region 110, a second region 120, and/or a third region 130.

In an embodiment, the pipe 100 may be bent at least in a portion through a bending process. For example, a portion of the pipe 100 may be bent in a direction substantially perpendicular to the other portion through a local bending process. For example, the second region 120 of the pipe 100 may be bent through the bending process in a direction perpendicular to a direction in which the first region 110 of the pipe 100 is extended.

In an embodiment, a portion of the pipe 100 may be extended in a direction substantially perpendicular to the other portion. For example, the first region 110 may be extended substantially perpendicularly to the second region 120. With reference to FIG. 1, the first region 110 may be extended in a direction parallel to the X-axis direction, and the second region 120 may be extended in a Y-axis direction perpendicular to the X-axis direction.

In the pipe connection device 10 according to an embodiment of the disclosure, since the first region 110 and the second region 120 are formed substantially perpendicularly to each other, a space occupied by the pipe connection device 10 can be reduced.

In an embodiment, the third region 130 may be connected to the first region 110 at one end and connected to the second region 120 at the other end.

In an embodiment, the third region 130 may be bent at least in a portion. For example, the third region 130 may be bent and extended from a direction parallel to the X-axis direction to a direction parallel to the Y-axis direction.

In an embodiment, the pipe 100 may include a passage through which a refrigerant can flow. For example, the pipe 100 may have a pipe hole 105, and a refrigerant can flow inside the pipe hole 105.

In an embodiment, the pipe hole 105 may be extended through the first region 110, the second region 120, and the third region 130.

In an embodiment, a refrigerant for an air conditioner can flow inside the pipe 100. For example, a refrigerant for an air conditioner can flow inside the pipe hole 105 of the pipe 100.

In an embodiment, the pipe 100 may be joined to an external pipe (not shown) at an end.

In an embodiment, the flange 200 may refer to a pipe joint to which the pipe 100 is joined.

In an embodiment, the flange 200 may be one of examples of a pipe joint to which the pipe 100 is joined.

In an embodiment, the pipe 100 may be joined to the flange 200 at least in a portion. For example, as shown in FIG. 1, the pipe 100 may be joined to the flange 200 at a portion of the second region 120.

In an embodiment, the pipe 100 may be joined to the flange 200 such that at least a portion penetrates at least a portion of the flange 200.

In an embodiment, the flange 200 may include at least one coupling hole 210 and/or a fastening hole 220.

In an embodiment, the coupling hole 210 may be a hole into which the pipe 100 is joined.

In an embodiment, the fastening hole 220 may be a hole used for fastening the flange 200 and an external object by using a separate fastening member (e.g., a bolt).

In an embodiment, the fastening hole 220 may include a first fastening hole 221 and/or a second fastening hole 222.

The number of joining holes 210 and fastening holes 220 shown in FIG. 1 is exemplary, and the number of joining holes 210 and fastening holes 220 is not be limited thereto. For example, in another embodiment, the flange 200 may include two or more joining holes 210. In yet another embodiment, the flange 200 may include three or more fastening holes 220.

In an embodiment, when the pipe 100 and the flange 200 are joined, the second region 120 of the pipe 100 may be arranged to penetrate the coupling hole 210 of the flange 200. At least a portion of the second region 120 of the pipe 100 may be joined into the coupling hole 210 of the flange 200.

In an embodiment, the flange 200 may have a plate shape with a predetermined thickness. For example, as shown in FIG. 1, the flange 200 may include a plate shape having a predetermined thickness in the Y-axis direction.

In an embodiment, the flange 200 may be formed to have a certain region with a larger width than the other region. For example, in the flange 200, the region where the coupling hole 210 is formed may have a larger width (e.g., length in the X-axis direction) than the region where the fastening hole 220 is formed.

In an embodiment, the second region 120 of the pipe 100 may include an expanded portion 125. The expanded portion 125 may be a portion formed with a larger diameter than the other portion of the second region 120.

In an embodiment, the expanded portion 125 of the pipe 100 can be in close contact with the inner surface of the coupling hole 210 of the flange 200. When the expanded portion 125 is in close contact with the coupling hole 210, the pipe 100 can be fixed to a predetermined position in the flange 200.

In an embodiment, the pipe connection device 10 may be fixed to an external object through the flange 200. For example, the flange 200 may be fixed to an external object in such a way that a fastening member (e.g., a bolt) to be fixed to the external object is fastened to the fastening hole 220 of the flange 200.

Figure 2:
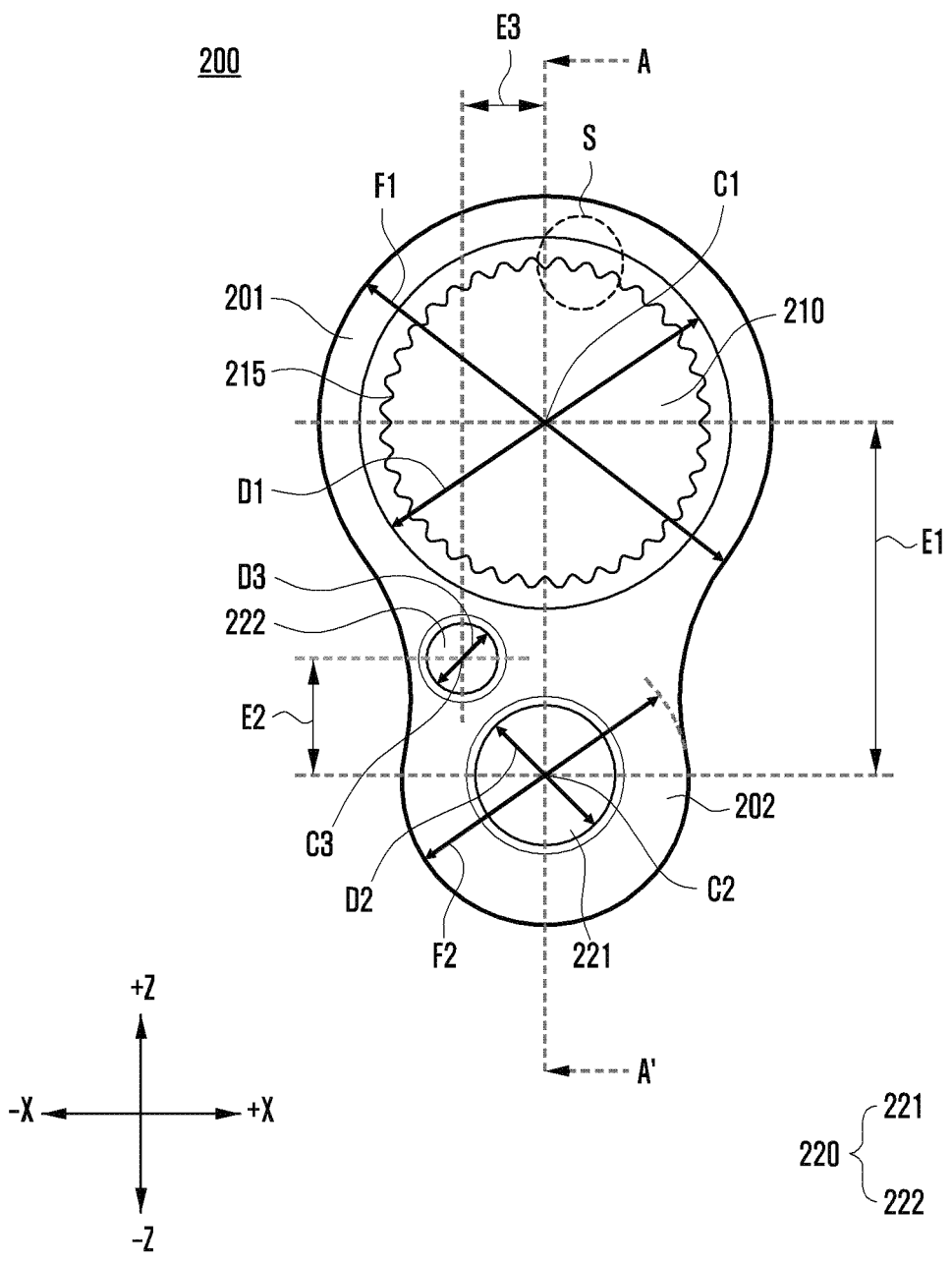
FIG. 2 is a front view showing a flange according to an embodiment of the disclosure.

FIG. 2 is a front view showing a flange 200 according to an embodiment of the disclosure.

FIG. 2 shows only the flange 200 by omitting the pipe 100 in the pipe connection device 10 shown in FIG. 1.

In describing the flange 200 according to an embodiment of the disclosure, the length direction of the flange 200 refers to the Z-axis direction, and the width direction of the flange 200 refers to the X-axis direction.

In an embodiment, the flange 200 may include the coupling hole 210 and/or the fastening hole 220.

In an embodiment, the flange 200 may include a plurality of fastening holes 220. For example, as shown in FIG. 2, the fastening hole 220 may include a first fastening hole 221 and/or a second fastening hole 222.

In an embodiment, the coupling hole 210 may be formed with a size corresponding to the pipe 100 (see FIG. 1) to be joined to the flange 200.

In an embodiment, the fastening hole 220 may be formed with a size corresponding to a fastening member (e.g., a bolt) to be fastened to the flange 200.

In an embodiment, the coupling hole 210 may have a first diameter D1. The first fastening hole 221 may have a second diameter D2. The second fastening hole 222 may have a third diameter D3.

In an embodiment, the sizes of the coupling hole 210 and the fastening hole 220 may be different from each other. For example, the first diameter D1 of the coupling hole 210 may be greater than the second diameter D2 of the first fastening hole 221.

In an embodiment, the first diameter D1 of the coupling hole 210 may be approximately 20 to 25 mm. In an embodiment, the second diameter D2 of the first fastening hole 221 may be approximately 5 to 10 mm.

In an embodiment, the sizes of the first fastening hole 221 and the second fastening hole 222 may be different from each other. For example, the second diameter D2 of the first fastening hole 221 may be greater than the third diameter D3 of the second fastening hole 222.

In an embodiment, the coupling hole 210 and the fastening hole 220 may be positioned at a distance from each other. For example, a first center C1, which is the center of the coupling hole 210, may be positioned at a distance from a second center C2, which is the center of the first fastening hole 221, in the length direction (e.g., the Z-axis direction) of the flange 200 by a first separation distance E1. In an embodiment, the first separation distance E1 may be approximately 17 to 22 mm.

In an embodiment, since the coupling hole 210 and the fastening hole 220 are positioned at a distance from each other, interference between the pipe 100 (see FIG. 1) and the fastening member (e.g., bolt) can be prevented or reduced when the pipe 100 (see FIG. 1) is joined to the flange 200.

In an embodiment, the first fastening hole 221 and the second fastening hole 222 may be positioned at a distance from each other. For example, the second center C2, which is the center of the first fastening hole 221, may be positioned at a distance from a third center C3, which is the center of the second fastening hole 222, in the length direction (e.g., the Z-axis direction) of the flange 200 by a second separation distance E2. Also, the second center C2, which is the center of the first fastening hole 221, may be positioned at a distance from the third center C3, which is the center of the second fastening hole 222, in the width direction (e.g., the X-axis direction) of the flange 200 by a third separation distance E3.

In an embodiment, the flange 200 may include a serration 215 at least in a portion. For example, as shown in FIG. 2, the serration 215 may be formed along the inner perimeter of the coupling hole 210.

In an embodiment, the serration 215 may have a form in which a concave portion 2151 (see FIG. 4) and a protrusion portion 2152 (see FIG. 4) are alternately positioned along the inner perimeter of the coupling hole 210.

In an embodiment, the serration 215 may serve to strengthen the fixation between the pipe 100 (see FIG. 1) and the flange 200. For example, when the pipe 100 (see FIG. 1) and the flange 200 are joined, the serration 215 may serve to fix the pipe 100 (see FIG. 1) to a predetermined position in the flange 200 by compressing the outer surface of the pipe 100 (see FIG. 1).

In an embodiment, the pipe 100 (see FIG. 1) may have a stepped shape corresponding to the serration 215 on at least a portion of the outer surface of the pipe 100 (see FIG. 1). In an embodiment, when the pipe 100 (see FIG. 1) is jointed to the flange 200, the stepped shape formed on the outer surface of the pipe 100 (see FIG. 1) may engage with the serration 215.

In an embodiment, the flange 200 may include a first support region 201 and/or a second support region 202.

In an embodiment, the first support region 201 may be an area of the flange 200 where the coupling hole 210 is located.

In an embodiment, the second support region 202 may be an area of the flange 200 where the at least one fastening hole 220 is located.

In an embodiment, the flange 200 may have a fanwise shape. For example, at least a portion of the first support region 201 may be extended to have a fan-shaped perimeter. In addition, at least a portion of the second support region 202 may be extended to have a fan-shaped perimeter.

In an embodiment, the width of the first support region 201 may be greater than the width of the second support region 202. For example, the perimeter of the first support region 201 may include a portion of a circumference of a circle having a fourth diameter F1. Also, the perimeter of the second support region 202 may include a portion of a circumference of a circle having a fifth diameter F2.

In an embodiment, the fourth diameter F1 may be greater than the fifth diameter F2. In an embodiment, the fourth diameter F1 may be approximately 25 to 30 mm. In an embodiment, the fifth diameter F2 may be approximately 15 to 20 mm.

Figure 3:
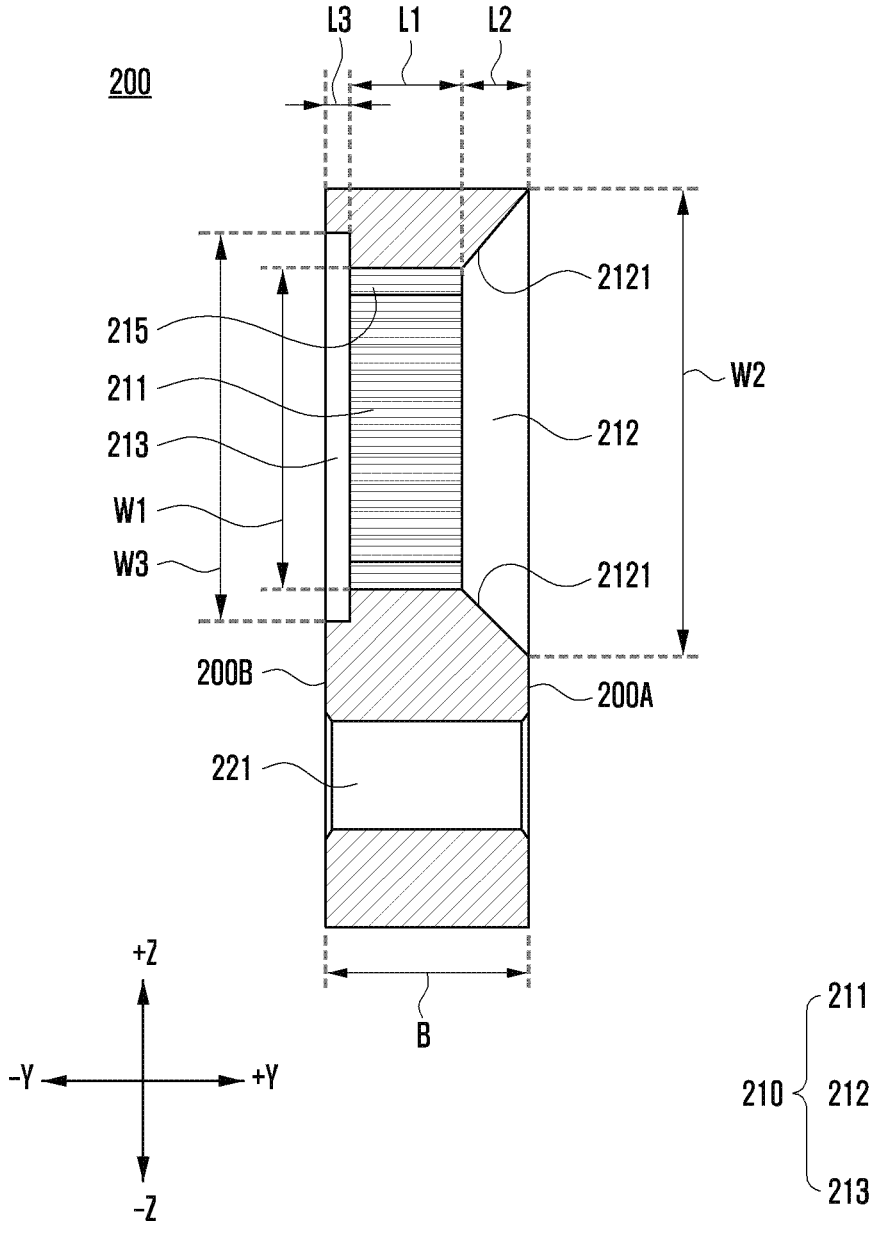
FIG. 3 is a cross-sectional view showing a flange taken along line A-A' of FIG. 2.

FIG. 3 is a cross-sectional view showing a flange 200 taken along line A-A' of FIG. 2.

In describing the flange 200 according to an embodiment of the disclosure, the length direction of the flange 200 refers to the Z-axis direction, and the thickness direction of the flange 200 refers to the Y-axis direction. In an embodiment, the thickness direction of the flange 200 is a direction substantially perpendicular to the length direction (e.g., the Z-axis direction) of the flange 200 and the width direction (e.g., the X-axis direction) of the flange.

In an embodiment, the coupling hole 210 may be formed to penetrate one side surface 200A of the flange 200 and the other side surface 200B opposite to the one side surface 200A. In an embodiment, the coupling hole 210 may be formed to penetrate the flange 200 in the thickness direction (e.g., the Y-axis direction) of the flange 200.

In an embodiment, the coupling hole 210 may include a first part 211, a second part 212, and/or a third part 213.

In an embodiment, the first part 211 and the second part 212 may be formed in different shapes. For example, as shown in FIG. 3, the perimeter of the first part 211 may be extended in parallel with one direction (e.g., the Y-axis direction). In addition, the perimeter of the second part 212 may be extended in an inclined direction based on the perimeter of the first part 211.

In an embodiment, the first part 211 may be extended in a direction substantially parallel to the thickness direction (e.g., the Y-axis direction) of the flange 200. In an embodiment, the first part 211 may be a straight section extended in parallel with one direction (e.g., the Y-axis direction) in the entire sections of the coupling hole 210.

In an embodiment, the first part 211 may be formed by a circular opening having a diameter of a first width W1 and extended in a direction substantially parallel to the thickness direction (e.g., the Y-axis direction) of the flange 200.

In an embodiment, the first part 211 may include the serration 215. The serration 215 may be formed along the perimeter of the first part 211.

In an embodiment, the serration 215 may be in contact with the outer surface of the pipe 100 (see FIG. 1) joined into the coupling hole 210, thereby serving to strengthen the joint between the pipe 100 (see FIG. 1) and the flange 200.

The flange 200 according to an embodiment of the disclosure may include the serration 215 only in a part of the coupling hole 210. For example, in the flange 200 according to an embodiment, the first part 211 extended substantially in parallel with the thickness direction (e.g., Y-axis direction) of the flange 200 may include the serration 215, and the second part 212 formed obliquely with the thickness direction (e.g., the Y-axis direction) of the flange 200 may not include the serration 215.

Since the flange 200 according to an embodiment includes the serration 215 only in a part (e.g., the first part 211) of the coupling hole 210, it is possible to reduce the time and cost for forming the serration 215 in the flange 200.

In an embodiment, the second part 212 may be extended from the first part 211 to the one side surface 200A of the flange 200.

In an embodiment, the second part 212 may be connected to the first part 211 at one end and connected to the one side surface 200A of the flange 200 at the other end opposite to the one end.

In an embodiment, the second part 212 may be an inclined section extended obliquely at least in part with respect to the thickness direction (e.g., the Y-axis direction) of the flange 200 in the entire sections of the coupling hole 210.

In an embodiment, the second part 212 may include an inclined surface 2121. In an embodiment, the inclined surface 2121 may be formed to be inclined with respect to the thickness direction (e.g., the Y-axis direction) of the flange 200.

In an embodiment, the inclined surface 2121 may serve to guide the pipe 100 (see FIG. 1) to be positioned at a predetermined position in the flange 200. For example, in an embodiment, when the pipe 100 (see FIG. 1) is joined to the flange 200, the expanded portion 125 of the pipe 100 (see FIG. 1) may come into contact with the inclined surface 2121. As the expanded portion 125 of the pipe 100 (see FIG. 1) comes into contact with the inclined surface 2121, the pipe 100 (see FIG. 1) can be positioned at a predetermined position in the flange 200.

In an embodiment, the second part 212 may have different lengths at one end and the other end in the length direction (e.g., the Z-axis direction) of the flange 200. For example, the second part 212 may have a first width W1 at one end and have a second width W2 at the other end. In an embodiment, the second width W2 may be greater than the first width W1.

In an embodiment, the third part 213 may be extended from the first part 211 to the other side surface 200B opposite to the one side surface 200A of the flange 200.

In an embodiment, the third part 213 may be formed by a circular opening having a diameter of a third width W3 and extended in a direction substantially parallel to the thickness direction (e.g., the Y-axis direction) of the flange 200.

In an embodiment, the width of the third part 213 may be greater than the width of the first part 211. For example, the third width W3 of the third part 213 may be greater than the first width W1 of the first part 211.

In the flange 200 according to an embodiment, the coupling hole 210 may have a width of a certain part greater than that of the other part to allow the pipe 100 (see FIG. 1) to be easily inserted into the coupling hole 210. For example, the third width W3 of the third part 213 may be formed greater than the first width W1 of the first part 211, so that the pipe 100 (see FIG. 1) can be easily inserted into the coupling hole 210 of the flange 200.

In an embodiment, the first part 211, the second part 212, and the third part 213 may be extended to different lengths in the thickness direction (e.g., the Y-axis direction) of the flange 200. For example, the first part 211 may be extended to a first length L1 in the thickness direction (e.g., the Y-axis direction) of the flange 200. The second part 212 may be extended to a second length L2 in the thickness direction (e.g., the Y-axis direction) of the flange 200. The third part 213 may be extended to a third length L3 in the thickness direction (e.g., the Y-axis direction) of the flange 200. In an embodiment, the first length L1, the second length L2, and the third length L3 may be different lengths.

In an embodiment, the first length L1 may be greater than the second length L2 and the third length L3. In an embodiment, the second length L2 may be greater than the third length L3.

In an embodiment, the first part 211 may be a portion of the coupling hole 210 that includes the serration 215 that is in close contact with the pipe 100 (see FIG. 1) and fixes the pipe 100 (see FIG. 1). In the flange 200 according to an embodiment, the first length L1 of the first part 211 may be formed to be greater than the second length L2 of the second part 212 and the third length L3 of the third part 213.

In an embodiment, the length of the coupling hole 210 extended in the thickness direction (e.g., the Y-axis direction) of the flange 200 may be substantially equal to the thickness B of the flange 200. For example, the sum of the first length L1, the second length L2, and the third length L3 may be substantially equal to the thickness B of the flange 200.

In an embodiment, the thickness of the flange 200 may be approximately 9 to 15 mm. In an embodiment, the first length L1 may be approximately 5 to 8 mm. In an embodiment, the second length L2 may be approximately 3 to 5 mm. In an embodiment, the third length L3 may be approximately 1 to 2 mm.

In an embodiment, the first fastening hole 221 may be formed at a distance from the coupling hole 210. For example, as shown in FIG. 3, the first fastening hole 221 may be formed at a distance from the coupling hole 210 in the length direction (e.g., the Z-axis direction) of the flange 200.

In an embodiment, at least a portion of the pipe 100 (see FIG. 1) may be joined to the flange 200. For example, the pipe 100 (see FIG. 1) may be joined to the flange 200 such that a portion (e.g., the second region 120, see FIG. 1) of the pipe 100 (see FIG. 1) penetrates the first part 211, the second part 212, and the third part 213 of the coupling hole 210.

Figure 4:
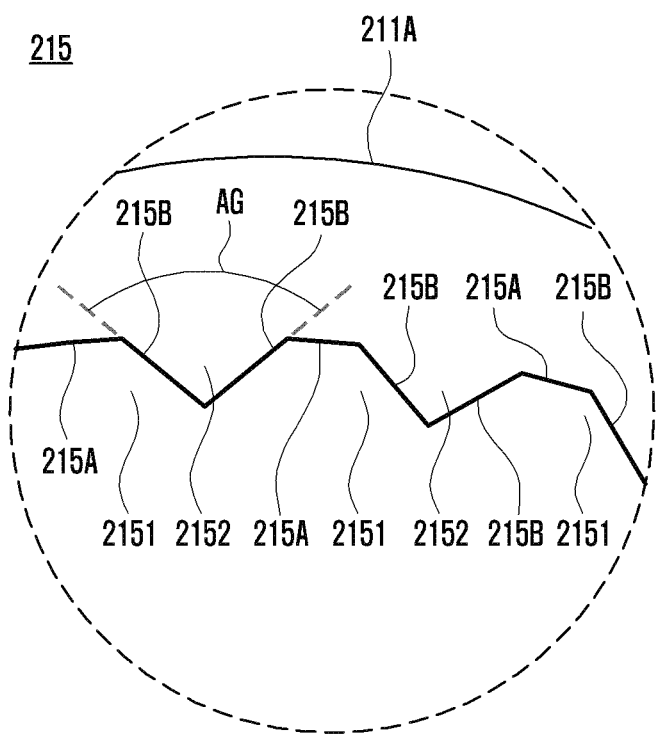
FIG. 4 is an enlarged view showing a serration according to an embodiment of the disclosure.

FIG. 4 is an enlarged view showing a serration 215 according to an embodiment of the disclosure.

FIG. 4 is an enlarged view of the part 'S' shown in FIG. 2.

With reference to FIG. 4, the serration 215 may include a concave portion 2151 and/or a protrusion portion 2152.

In an embodiment, the serration 215 may include a plurality of concave portions 2151 and a plurality of protrusion portions 2152. As shown in FIG. 4, the concave portions 2151 and the protrusion portions 2152 may be arranged alternately.

In an embodiment, the serration 215 may include a plurality of first surfaces 215A and/or a plurality of second surfaces 215B.

As shown in FIG. 4, the serration 215 according to an embodiment may be formed along a peripheral surface 211A of the first part 211 (see FIG. 3).

In an embodiment, the peripheral surface 211A of the first part 211 (see FIG. 3) may refer to a circular surface forming the outer perimeter of the first part 211 (see FIG. 3).

In an embodiment, the first surface 215A of the serration 215 may be a surface formed substantially in parallel with the peripheral surface 211A of the first part 211 (see FIG. 3).

In an embodiment, the second surface 215B of the serration 215 may be a surface formed to be inclined with respect to the first surface 215A.

In an embodiment, the concave portion 2151 may be formed by one first surface 215A and two second surfaces 215B. For example, the concave portion 2151 may be a portion defined by one first surface 215A of the serration 215 and two second surfaces 215B located on one side and the other side of the first surface 215A.

In an embodiment, the protrusion portion 2152 may be formed by two adjacent second surfaces 215B. For example, the protrusion portion 2152 may be a portion having a protruding shape defined by two second adjacent surfaces 215B of the serration 215.

In an embodiment, the serration 215 may be formed such that an angle AG between the two adjacent second surfaces 215B forming one protrusion portion 2152 is within a predetermined angular range. For example, in an embodiment, the angle AG between two adjacent second surfaces 215B forming one protrusion portion 2152 may be formed to be approximately 100 to 120 degrees.

According to an embodiment of the disclosure, a pipe connection device 10 may include a pipe 100 including a first region 110 and a second region 120 extended perpendicularly to the first region 110, and a flange 200 including a coupling hole 210 into which at least a portion of the second region 120 of the pipe 100 is joined. The coupling hole 210 may include a first part 211 including a serration 215 and extended in parallel with a thickness direction of the flange 200, and a second part 212 including an inclined surface 2121 formed to be inclined based on the thickness direction of the flange 200, and extended from the first part 211 to one side surface 200A of the flange 200.

The pipe connection device 10 according to an embodiment of the disclosure connects the pipe 100 and the flange 200 by joining the second region 120 of the pipe 100 to a part (e.g., the joining hole) of the flange 200, so that the overall size can be reduced.

The pipe connection device 10 according to an embodiment of the disclosure can reduce the space occupied by the pipe connection device 10 because the second region 120 of the pipe 100 is extended in a direction perpendicular to the first region 110 of the pipe 100.

The flange 200 according to an embodiment of the disclosure can improve the joining force between the pipe 100 and the flange 200 by including the serration 215 in the part joined to the pipe 100.

In an embodiment, the second part 212 may be connected to the first part 212 at one end while having a first width W1, and be connected to the one side surface 200A of the flange 200 at other end while having a second width W2.

In an embodiment, the second width W2 may be greater than the first width W1.

In an embodiment, the coupling hole 210 may further include a third part 213 extended from the first part 211 to other side surface 200B opposite to the one side surface 200A of the flange 200.

In an embodiment, the third part 213 may have a greater width than the first part 211 and be extended from the first part 211 to the other side surface of the flange 200 in parallel with the thickness direction of the flange.

In an embodiment, the flange 200 may be formed at a distance from the coupling hole 210 and may further include a fastening hole 220 having a smaller diameter than the coupling hole 210.

In an embodiment, the serration 215 may include a first surface 215A formed in parallel with a peripheral surface 211A of the first part 211, and a second surface 215B formed to be inclined with respect to the first surface 215A.

In an embodiment, the serration 215 may include a protrusion portion 2152 formed by two of the second surfaces 215B.

In an embodiment, an angle between the two second surfaces 215B forming the protrusion portion 2152 may be formed to be 100 to 120 degrees.

In an embodiment, the pipe 100 may include a passage (e.g., the pipe hole 105) through which a refrigerant for an air conditioner flows.

A flange 200 for pipe joint according to an embodiment of the disclosure may include a coupling hole 210 into which at least a portion of an external pipe is joined. The coupling hole 210 may include a first part 211 including a serration 215 and extended in parallel with a thickness direction of the flange 200, and a second part 212 including an inclined surface 2121 formed to be inclined based on the thickness direction of the flange 200, and extended from the first part 211 to one side surface 200A of the flange 200.

The embodiments of the disclosure disclosed in this specification and drawings are merely specific examples presented to easily explain the technical contents according to the embodiments of the disclosure and to help understand the embodiments of the disclosure, and are not intended to limit the scope of the embodiments of the disclosure. Therefore, the scope of the various embodiments of the disclosure should be interpreted as including all changes or modified forms derived based on the technical ideas of the various embodiments of the disclosure in addition to the embodiments disclosed herein.

| Explanation of Reference Numerals |
| --- |
| 10: Pipe connection device |
| 100: Pipe |
| 110: First region |
| 120: Second region |
| 125: Expanded portion |
| 130: Third region |
| 200: Flange |
| 210: Coupling hole |
| 211: First part |
| 212: Second part |
| 213: Third part |
| 215: Serration |
| 220: Fastening hole |
| 221: First fastening hole |
| 222: Second fastening hole |

What is claimed is:

1. A pipe connection device comprising:
   a pipe including a first region and a second region extended perpendicularly to the first region; and
   a flange including a coupling hole into which at least a portion of the second region of the pipe is joined,
   wherein the coupling hole includes:
   a first part including a serration and extended in parallel with a thickness direction of the flange;
   a second part including an inclined surface extending from the first part to one side surface of the flange while being inclined based on the thickness direction of the flange; and a third part extending from the first part to the other side surface, which is opposite to the one side surface of the flange, in parallel with the thickness direction of the flange, wherein the serration includes:

a first surface formed in parallel with a peripheral surface of the first part;

second surfaces formed to be inclined with respect to the first surface; and a protrusion formed by two of the second surfaces, and wherein an angle between the two second surfaces forming the protrusion is formed to be 100 degrees to 120 degrees.

2. The pipe connection device of claim 1, wherein the second part is connected to the first part at one end while having a first width, and is connected to the one side surface of the flange at the other end while having a second width, and the second width is greater than the first width.

3. The pipe connection device of claim 1, wherein the third part has a greater width than the first part.

4. The pipe connection device of claim 1, wherein the flange is formed at a distance from the coupling hole and further includes a fastening hole having a smaller diameter than the coupling hole.

5. The pipe connection device of claim 1, wherein the pipe includes a passage through which a refrigerant for an air conditioner flows.

6. A flange for pipe joint comprising:

a coupling hole into which at least a portion of an external pipe is joined, wherein the coupling hole includes:

a first part including a serration and extended in parallel with a thickness direction of the flange;

a second part including an inclined surface extending from the first part to one side surface of flange while being inclined based on the thickness direction of the flange; and a third part extending from the first part to the other side surface, which is opposite to the one side surface of the flange, in parallel with the thickness direction of the flange, wherein the serration includes:

a first surface formed in parallel with a peripheral surface of the first part;

second surfaces formed to be inclined with respect to the first surface; and a protrusion formed by two of the second surfaces, and wherein an angle between the two second surfaces forming the protrusion is formed to be 100 degrees to 120 degrees.

7. The flange of claim 6, wherein the second part is connected to the first part at one end while having a first width, and is connected to the one side surface of the flange at the other end while having a second width, and the second width is greater than the first width.

8. The flange of claim 6, wherein the third part has a greater width than the first part.

* * * * *